COLOUR TELEVISION PICK UP SYSTEMS

Filed July 23, 1963 2 Sheets-Sheet 1

INVENTOR
PIERRE CASSAGNE
BY [signature]
AGENT

INVENTOR
PIERRE CASSAGNE
By [signature]
AGENT 3,250,854

COLOUR TELEVISION PICK UP SYSTEMS

Pierre Cassagne, Levallois, France, assignor to Compagnie Francaise de Television, a corporation of France Filed July 23, 1963, Ser. No. 297,151
Claims priority, application France, July 25, 1962, 905,001
8 Claims. (Cl. 178—5.4)

The present invention relates to apparatus for generating colour television signals. More particularly, it is an object of the invention to provide an improved apparatus providing a high quality luminance signal and perfectly synchronous primary colour signals, with a satisfactory signal-to-noise ratio, due to the smaller definition which is then acceptable for these latter signals.

In a known colour television pick up system, known as the Vitascan system, the three primary colours, i.e., the red, blue and green signals are supplied by scanning point by point the scene to be televised in a dark studio, with a beam of luminous rays supplied by a cathode-ray tube, whose electron beam sweeps the screen of the tube in accordance with the television standard used. The colour signals are supplied by groups of photo-electric cells which receive the light from the subject through coloured optical filters. Since actors and operators cannot work in the dark, the studio as a whole is illuminated by a pulsed light during the vertical blanking periods.

In the arrangement according to the invention, colour signals are obtained on the same principle, but a high quality luminance signal is simultaneously obtained by means of an analyzer storage tube, whose photo-sensitive surface receives the light reflected from the scene during the time intervals when the studio is being illuminated by the pulsed light.

According to the invention, there is provided a colour television pick up arrangement, of the type operating in a studio which is illuminated by pulsed light during inactive periods of the scanning apparatus, and where colour signals are generated by means of photoelectric cells, the scene to be televised being scanned by means of a cathode ray tube, whose screen is swept by the electron beam of the tube in accordance with the standard of the television system for which the arrangement is used, wherein said arrangement further comprises an analyzer storage tube for generating a luminance signal corresponding to the colour signals which are generated by means of the photoelectric cells, the analyzer tube and the cathode ray tube being, to that end, fed with synchronous sweeping signals, and placed in such a manner and associated with such an optical apparatus that the luminous rays reflected from the scene being televised during the periods of general illumination of the studio reach the photosensitive target of the analyzer tube to form thereon an image of the scene being televised such that, at every scanning instant, the point of the corresponding electron image being scanned by the electron beam of the analyzer tube corresponds to that point of the scene which is scanned at the same instant by the luminous beam from the cathode ray tube.

Figure 1:
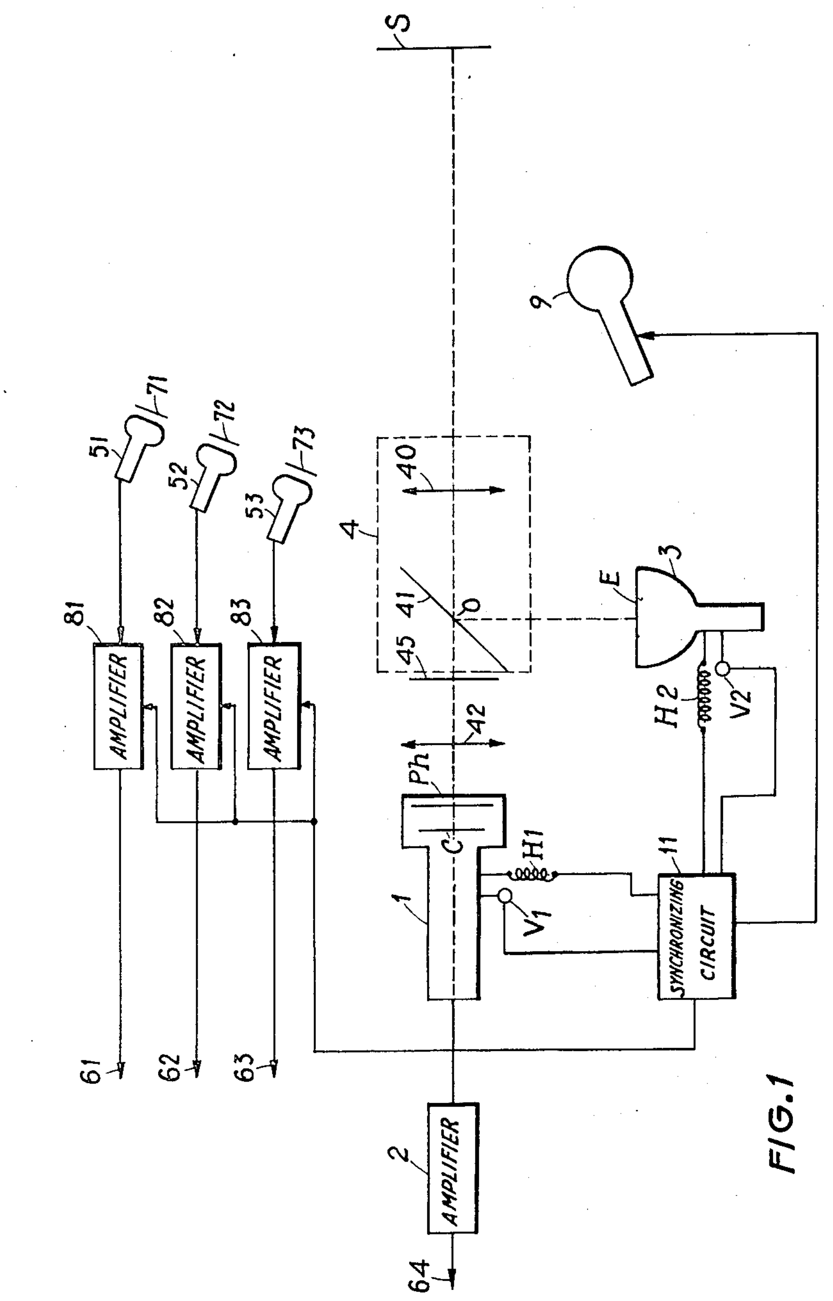
Figure 2:
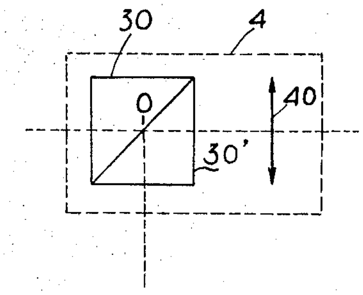
Figure 3:
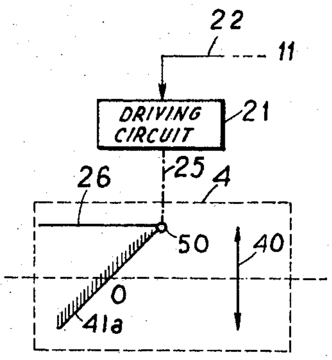
Figure 4:
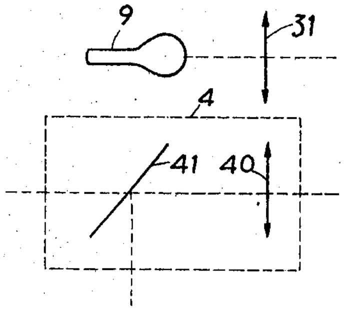

The invention will be better understood and other characteristics thereof will become apparent from the following description and the appended drawing wherein:

FIG. 1 is a schematic showing of one embodiment of the system according to the invention; and FIGS. 2, 3 and 4 illustrate modifications of the arrangement of FIG. 1.

This system shown in FIG. 1, where the scene to be televised is represented by a vertical line S, includes, for obtaining primary colour signals, an arrangement similar to that of the Vitascan system and consisting essentially of:

A cathode-ray tube 3 which is used to illuminate the subject point by point. Only its envelope, screen E, horizontal deflection system H2 and vertical deflection V2 are diagrammatically shown. However, in the present arrangement, the axis of tube 3 is not perpendicular to the scene to be televised, this scene being illuminated by it through an optical arrangement 4 which will be described later.

Conventional circuits 11, which supply all the synchronizing and scanning signals required for taking the picture, and among others the horizontal scanning saw-tooth signals, to system H3 and vertical scanning saw-tooth signals to system V3.

At least one group of photoelectric cells of the photomultiplier type receiving through optical colour filters the rays reflected by that point of the object which is being illuminated by tube 3. The figure shows, without this being in any way restrictive, a group of three cells only, 51, 52 and 53, respectively placed behind a red filter 71, a green filter 72 and a blue filter 73. These cells feed respectively three video amplifier chains 81, 82 and 83, having respective outputs 61, 62 and 63.

In this example the studio is illuminated by an arrangement consisting only of a flash lamp 9, which is controlled according to known art by vertical blanking pulses supplied to it by circuit 11, so that it is operative only for the duration of these pulses. However, the frequency of these illuminations is sufficient, taking into consideration the optical remanence, for the room to appear continuously illuminated insofar as actors and operators are concerned.

To avoid overloading the blue, red and green channels vertical blanking pulses are applied to amplifier chains 81, 82 and 83 to switch them out while lamp 9 is in action.

According to the invention an analyzer storage tube, for example an image orthicon 1, is added to this arrangement. Only the envelope of this tube, its horizontal deflection system H1, its vertical deflection system VI, its photo-cathode P*h* and its target C are shown. It is known that in such a tube the picture to be analyzed is projected on the photo-cathode which bombards target C with photoelectrons, this target C being scanned by the beam of the tube to produce the output signal.

The output of tube 1 feeds a video amplifier stage 2 with an output 64.

System H1 receives from circuit 11 horizontal scanning saw-tooth signals synchronous with those applied to system H2 of tube 3; similarly, vertical deflection system VI receives from circuits 11 vertical scanning saw-tooth signals synchronous with those applied to system V2 of tube 3.

In this way a bi-univocal correspondence is assured between points of screen E and points of target C. Since there is also, by construction, bi-univocal correspondence between points of target C and points of photo-cathode P*h*, one may equally speak of homologous points of photo-cathode P*h* and of screen E of tube 3.

Tubes 1 and 3 are so arranged and associated with an optical system 4 of structure such, that the image of a given illuminated point P may be formed on two homologous points of screen E and of photo-cathode P*h* of tube 1.

In other words, since the optical paths are reciprocal, the image of a point P of scene S, selectively illuminated by tube 3, due to the impact of the electron beam of this tube on a point P3 of screen E, is formed on the photosensitive surface P*h*, at point P1 homologous to point P3 of screen E, and consequently of point P'1 of the target scanned by the beam of tube 1 at the same time as point P3 is scanned by the beam of tube 3.

To this end, the arrangement 1–3–4 can be arranged as shown in the figure: the axes of tubes 1 and 3 are in the same vertical plane and intersect at a point O situated at appropriate distances from the center of the photo-cathode P*h* of tube 1 and from the center of screen E of tube 3. A semi-transparent mirror 41 has its center at point O, and its plane is at an angle of 45° with the photo-cathode P*h* of tube 1, and with screen E of tube 3; an optical lens system 40 is centered on the axis of tube 1 and placed in a direction perpendicular to that axis.

An additional optical system 42 can, if necessary, be placed in front of one of the two tubes, for example in front of the analyzer tube 1 in FIG. 1, to compensate for differences of optical field due for example to dimensional differences between photo-cathode P*h* and screen E. A correcting optical filter 45 may be placed between mirror 41 and the optical system 42.

Considering the whole of the arrangement, the distances from point O to the centers of photo-cathode P*h* and of screen E are such that the images of these centers at the output of the optical system 40 are formed at the same point of the axis of that optical system.

Under these conditions, by suitably orienting the assembly 1–3–4, with the axis of tube 1 pointed on the scene, and placing it an appropriate distance from the scene, the picture of the scene, once it is illuminated, can be formed on photo-cathode P*h* and on screen E.

As regards the collection of the primary colour signals R, B and G, the mode of operation of the arrangement, ignoring the path actually used for illuminating the subject by tube 3, is similar to that of the Vitascan system. Cells 51, 52 and 53 receive respectively the red light, the green light and the blue light from the point of the subject illuminated by tube 3 at any given instant, and the corresponding colour signals R, B and G are collected at outputs 61, 62 and 63. During the illumination periods amplifier stages 81, 82 and 83 are cut off, as already mentioned.

The operation of tube 1 used for producing the luminance signal requires, however, more luminous energy than can be supplied by the luminous rays reflected by a point P of the scene, when this point is illuminated by cathode-ray tube 3. On this account, the energy necessary is obtained not by this rapid and selective illumination of the various points of the scene, but rather by the luminous rays reflected by the scene as a whole during the periods the studio is illuminated by means of arrangement 9. These illumination periods affect all the points of the scene and for an appreciable duration. Depending on the intensity of the pulsed illumination device, or for other reasons of convenience, it may be found sufficient, as is the case in the example described, to illuminate during the vertical blanking intervals, or else during the horizontal blanking intervals, by means of a device controlled by the horizontal pulses. If both the horizontal and the vertical blanking intervals are used, it is advantageous to employ two independent illumination systems. Sufficient illumination of photo-cathode P*h* being obtained for insuring the formation of the electron image on target C, and, from what has already been said, a point P'1 of the target corresponding to a point P of the scene being scanned at the same time as the homologous point P3 of the screen which supplies the luminous beam illuminating said point P, a luminance signal corresponding to point P is obtained at output 64 at the same time as the primary colour signals relative to that same point are obtained at outputs 61, 62 and 63.

Tube 1 being an orthicon image tube, the law of variation of the signal it supplies is a linear function of the luminous flux. If the analyzer tube used did not meet this condition, the non-linearity would have to be corrected by a non-linear amplifier in a manner known to the art.

Contrary to the Vitascan system, the system according to the invention necessitates a synchronization between two scannings viz that of the analyzer tube 1 and that of the cathode-ray tube 3, but only two tubes have to be synchronized, which is still a considerable improvement on cameras requiring synchronization of three tubes.

Also, the system of the invention has some definite advantages over the Vitascan system:

(a) It provides directly a luminance signal—which is the most important—of high quality and high definition.

(b) This direct acquisition of the luminance signal makes it possible to obtain better primary colour signals.

For it is known that due to the sensitivity of the eye, colour information does not have to be transmitted at as high a definition as for the luminance information. Actually, in modern colour television systems, the luminance signal is transmitted as a high definition signal, and consequently a wide frequency band signal, while colour signals are transmitted with a reduced band-width. In camera arrangements which supply only the three primary colour signals, the luminance signal is derived from the three primary colour signals. Therefore, the primary colour signals have to be produced initially with a high definition, even if the colour signals which are actually transmitted have a narrow band. Accordingly, a direct generation of a high definition luminance signal makes it possible to do with narrow band initial primary colour signals, so obtaining a better signal-to-noise ratio for these signals.

This reduced definition of the colour signals may be obtained in several ways, for instance through limiting their frequency band in the video amplifiers, or through defocalizing the spot of cathode ray tube 3, or through using photo-electric cells whose response time is comparatively high.

In the arrangement; shown, it has been assumed that the luminance signal and the three primary colour signals are produced directly. However, this provides some redundant information, since the colour content of a point is fully given three independent informations and a pick-up arrangement providing a high-definition luminance signal and only two primary colour signals may be conceived.

However, depending upon the colour television system for which the pick-up arrangement is used, it may be more adequate to generate directly four signals.

In a general way the signals generated by means of the photoelectric cells will be chosen in consideration of the colour signals which are transmitted with a reduced bandwidth. They will not necessary be primary colour signals of this system and all of them need not be colour signals; one cell (or one set of cells) without an optical filter, or with only a correcting filter, may be used for generating a narrow band luminance signals.

The invention is of course not restricted to the embodiments described and shown and many variations are possible without departing from the spirit and scope of the invention.

Thus, another analyzer tube may be substituted for the orthicon image tube, provided it is of the accumulation type. In the case of a vidicon, for example, the photo-sensitive surface is one with the target, but the mode of operation remains the same; if the tube is non-linear, as in the case of the vidicon, its non-linearity is of course corrected by a non-linear amplifier, as known to the art.

In arrangement of FIG. 4, the fixed semi-transparent mirror 41 may be replaced by a collapsible non-transparent mirror **41*a***, this mirror being retracted during the periods the studio is illuminated, the mechanical device which operates this retraction being electrically operated by means of the vertical blanking pulses, also used for controlling the studio illumination.

To this end the arrangement shown in FIG. 3 may be used. In this figure the non-transparent mirror **41*a* is shown in the same position as mirror 41 in FIG. 1. Mirror 41*a* is mounted rotatably on a horizontal shaft 50 and is retracted into the horizontal position shown by line 26 during the vertical blanking intervals. To this end, the vertical blanking pulses supplied by circuit 11 are applied to the input 22 of an electro-mechanical device 21, whose mechanical coupling to shaft 50 is schematically represented by the dot-dash line 25**.

Mirror 41 may also be substituted by the known device, shown in FIG. 2, comprising two prisms, associated as shown in FIG. 2, with a semireflecting layer interposed therebetween. This layer has the same position as mirror 41 of FIG. 4.

Instead of the common optical lens system 40, two separate lens systems may be used for each of tubes 1 and 3, these systems being then placed on the prolongation of the axes of these tubes before point O.

Illumination systems 9 may be included in the camera to ensure that the "view points" of the two illumination sources are identical, as shown, for example, in FIG. 4, where lamp 9 is shown placed in appropriate fashion above device 4, with the light supplied by lamp 9 directed on the subject by means of an optical system 31 whose axis is parallel to that of lens system 40.

The axes of tubes 1 and 3 may be set at right angles in the same horizontal plane. The positions of tubes 1 and 3 could be interchanged, but the arrangement described for tube 1 in FIG. 1 is to be preferred.

What is claimed is:

1. A colour television pick up arrangement for operation in a studio which is illuminated by means of pulsed light during inactive periods of the scanning comprising:

a cathode-ray tube for producing a luminous beam scanning a scene and photo-electric cells associated with respective optical filters for generating synchronous picture colour signals relative to said scene;

and a system for generating a luminance signal relative to said scene and synchronous with said colour signals, said system comprising: an analyzer tube of the storage type including a photosensitive layer; means for applying to said analyzer tube sweeping signals, synchronous with those applied to said cathode ray tube; and an optical apparatus for projecting onto said photosensitive layer, during the periods of illumination of the studio, an optical image of said scene as scanned by said luminous beam.

2. A colour television pick up arrangement for operation in a studio which is illuminated by means of pulsed light during inactive periods of the scanning comprising:

a cathode-ray tube for producing a luminous beam scanning a scene and photo-electric cells associated with respective optical filters for generating synchronous picture colour signals relative to said scene;

and a system for generating a luminance signal, relative to said scene and synchronous with said colour signals, said system comprising: an analyzer tube of the storage type comprising means, including a photosensitive layer, for generating an electron image of said scene and a gun for generating an electron beam; means for applying to said analyzer tube sweeping signals synchronous with those applied to said cathode ray tube; and an optical apparatus for projecting onto said photosensitive layer, during the periods of illumination of the studio, such an optical image of said scene that, during the scanning periods, the point of said electron beam corresponds at every instant to that point of the scene which is scanned by said luminous beam at the same instant.

3. A colour television pick up arrangement for operation in a studio which is illuminated by means of pulsed light during inactive periods of the scanning, comprising:

a cathode-ray tube producing a scanning luminous beam and photo-electric cells associated with respective optical filters for generating synchronous picture colour signals respectively relative to the points scanned by said beam;

and a system for generating a luminance signal relative to said points scanned by said beam and synchronous with said colour signals, said system comprising: an analyzer tube of the storage type including a photosensitive layer; said analyzer tube and said cathode-ray tube being so located with respect to each that their respective longitudinal axes intersect at right angles; means for applying to said analyzer tube sweeping signals, synchronous with those applied to said cathode ray tube; and an optical apparatus, including a semi-reflecting layer whose plane passes through the point of intersection of said axes and makes an angle of 45° with each of said axes, for both transmitting said luminous beam for scanning a scene and directing the luminous rays reflected from said scene to said photo-sensitive layer to form thereon an optical image of said scene as scanned by said luminous beam.

4. A colour television pick up arrangement as claimed in claim 3, wherein said semi-reflecting layer is the semi-reflecting layer of a semi-reflecting mirror.

5. A colour television pick up arrangement as claimed in claim 3, wherein said semi-reflecting layer is interposed between two prisms.

6. A colour television pick up arrangement for operation in a studio which is illuminated by means of pulsed light during inactive periods of the scanning, comprising:

a cathode-ray tube for producing a luminous beam scanning a scene and photo-electric cells associated with respective optical filters for generating synchronous picture colour signals relative to said scene;

and a system for generating a luminance signal relative to said scene and synchronous with said colour signals, said system comprising: an analyzer tube of the storage type including a photosensitive layer; said analyzer tube and said cathode-ray tube being so located with respect to each other that their respective longitudinal axes intersect at right angles; said axis of said analyzer tube being directed normally to said scene; means for applying to said analyzer tube sweeping signal synchronous with those applied to said cathode-ray tube; and optical apparatus including a non-transparent mirror rotatably mounted on a shaft to have a first position wherein its plane makes an angle of 45° with each of said axes for directing said luminous beam towards said scene, and a second position wherein it leaves a free optical transmission path between said scene and said photosensitive target to allow the luminous rays reflected from said scene to reach said photosensitive layer to form thereon an optical image of said scene as scanned by said luminous beam; and means, controlled by blanking pulses, for shifting said mirror from said first to said second position during said inactive periods.

7. A colour television pick up arrangement for operation in a studio which is illuminated by means of pulsed light during inactive periods of the scanning comprising:

a cathode-ray tube for producing a luminous beam scanning a scene and photo-electric cells associated with respective optical filters for generating synchronous picture colour signals relative to said scene;

and a system for generating a luminance signal relative to said scene, synchronous with said colour signals and of higher definition than said colour signals, said system comprising: an analyzer tube of the storage type including a photosensitive layer; means for applying to said analyzer tube sweeping signals synchronous with those applied to said cathode-ray tube; and an optical apparatus for projecting onto said photosensitive layer, during the periods of illumination of the studio, an optical image of said scene as scanned by said luminous beam.

8. A colour television pick up arrangement for operation in a studio which is illuminated by means of pulsed light during inactive periods of the scanning, comprising:

a cathode-ray tube for producing a luminous beam scanning a scene and photo-electric cells associated with respective optical filters for generating synchronous picture colour signals relative to said scene; and a system for generating a luminance signal relative to said scene and synchronous with said colour signals, said system comprising: an analyzer tube of the storage type including a photo-sensitive layer; said analyzer tube and said cathode-ray tube being so located with respect to each other that their respective longitudinal axes intersect at right angles; said axis of said analyzer tube being directed normally to said scene; an illuminating apparatus for producing said pulsed light, located in the vicinity of said analyzer tube and in fixed space relationship therewith; a first optical apparatus whose axis is parallel to said axis of said analyzer tube for projecting said pulsed light on said scene; means for applying to said analyzer tube sweeping signals synchronous with those applied to said cathode-ray tube; and a second optical apparatus for both directing said luminous beam from said cathode-ray tube to said scene and the luminous rays reflected from said scene during said scanning periods.

References Cited by the Examiner

UNITED STATES PATENTS 3,196,205 7/1965 Bedford ____________ 178—5.4

DAVID G. REDINBAUGH, *Primary Examiner.*

J. A. O'BRIEN, *Assistant Examiner.*